United States Patent
O'Leary et al.

(10) Patent No.: US 8,521,377 B1
(45) Date of Patent: Aug. 27, 2013

(54) OBD COMPLIANT RATIONALITY CHECK SYSTEM FOR ADAPTIVE CRUISE CONTROL

(75) Inventors: Patrick J. O'Leary, Clinton Township, MI (US); Barbara A. Shuler, Brighton, MI (US)

(73) Assignee: GM Global Technology Operations LLC

(*) Notice: Subject to any disclaimer, the term of this patent is extended or adjusted under 35 U.S.C. 154(b) by 0 days.

(21) Appl. No.: 13/470,799

(22) Filed: May 14, 2012

(51) Int. Cl.
  *G06F 7/00* (2006.01)
  *G06F 17/00* (2006.01)
  *G06F 19/00* (2006.01)

(52) U.S. Cl.
  USPC .............................................. 701/51; 701/93

(58) Field of Classification Search
  USPC ............... 701/51, 16, 104, 31.4, 29.2, 54, 55, 701/22, 97, 93, 96; 540/474; 477/5
  See application file for complete search history.

(56) References Cited

U.S. PATENT DOCUMENTS

| | | | |
|---|---|---|---|
| 6,370,470 B1* | 4/2002 | Yamamura et al. | 701/96 |
| 6,679,807 B2* | 1/2004 | Kato et al. | 477/107 |
| 8,260,498 B2* | 9/2012 | Deng | 701/41 |
| 8,315,775 B2* | 11/2012 | Biondo et al. | 701/93 |
| 8,355,851 B2* | 1/2013 | Inoue et al. | 701/93 |
| 2012/0265421 A1* | 10/2012 | Livshiz et al. | 701/102 |
| 2012/0271499 A1* | 10/2012 | Inoue et al. | 701/23 |

* cited by examiner

*Primary Examiner* — Thomas Black
*Assistant Examiner* — Robert Payne (57) ABSTRACT

A system includes a vehicle speed module that determines a speed of a vehicle. An engine control module receives a first target speed signal and a torque request signal from an adaptive cruise control (ACC) module. The ACC module is separate from the engine control module. A first comparison module compares the first target speed signal to the speed of the vehicle to generate a first assessment signal. A first target speed module sets a second target speed signal equal to one of the first target speed signal and a predetermined value based on the first assessment signal. The engine control module controls an engine to provide an engine output torque based on at least one of the torque request signal and the second target speed signal.

19 Claims, 7 Drawing Sheets

OBD COMPLIANT RATIONALITY CHECK SYSTEM FOR ADAPTIVE CRUISE CONTROL

FIELD

The present invention relates to adaptive cruise control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Adaptive cruise control (ACC) systems typically adjust a speed of a host vehicle to maintain a set vehicle speed while adjusting the speed of the host vehicle to maintain a predetermined distance from a target vehicle. Maintaining a predetermined distance from a target vehicle prevents a collision between the host vehicle and the target vehicle.

An ACC system may operate based on information from an object detection sensor (e.g. a radar sensor) that detects objects forward of a host vehicle. The ACC system adjusts the speed of the host vehicle based on location of a detected object relative to the host vehicle. The ACC system may temporarily reduce the vehicle speed of the host vehicle to maintain a predetermined distance between the host vehicle and the object. The speed of the host vehicle may be returned to a set vehicle speed when the object is at a distance that is greater than the predetermined distance.

An ACC system typically includes an ACC module and an engine control module (ECM). The ACC module is typically separate from the ECM and monitors cruise control switches, such as a set switch and a resume switch. The set switch is used by a vehicle operator to set a target speed. The resume switch may be used subsequent to ACC operation being interrupted to return ACC operation to maintaining a host vehicle at the target speed. ACC operation may be interrupted, for example, when the vehicle operator applies a vehicle brake. The ACC module generates an axle torque request based on the actuation of the cruise control switches, a distance between the host vehicle and an object, and the target speed. The ECM receives the axle torque request from the ACC module and then adjusts torque output of an engine based on the axle torque request.

SUMMARY

A system is provided and includes a vehicle speed module that determines a speed of a vehicle. An engine control module receives a first target speed signal and a torque request signal from an adaptive cruise control (ACC) module. The ACC module is separate from the engine control module. A first comparison module compares the first target speed signal to the speed of the vehicle to generate a first assessment signal. A first target speed module sets a second target speed signal equal to one of the first target speed signal and a predetermined value based on the first assessment signal. The engine control module controls an engine to provide an engine output torque based on at least one of the torque request signal and the second target speed signal.

In other features, a system is provided and includes an active module that detects whether an ACC module is in an active mode. A delay module generates a delay signal indicating whether the ACC module sets a first target speed signal within a predetermined period based on whether the ACC module is in the active mode. A first target speed module detects a change in a first target speed signal received from the ACC module and determines a magnitude of the change in the first target speed signal. A comparison module compares the magnitude to a predetermined range and generates an assessment signal based and the comparison. A second target speed module sets a second target speed signal equal to the first target speed signal based on the delay signal and the assessment signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An ACC module may transition to an active mode and set a target speed based on actuation of a set switch. The target speed may be set to a detected current vehicle speed. The current vehicle speed may be detected based on a signal from, for example, a wheel speed sensor. The ACC module may also generate an axle torque request based on the target speed and/or a distance between a host vehicle of the ACC module and a detected object. The ACC module may then provide the target speed and the axle torque request to an ECM. The ECM may adjust output torque of an engine based on the target speed and/or the axle torque request. The ECM may also indicate the target speed to a transmission control module (TCM). The TCM may then perform various operations based on the target speed. These operations may include, for example, shifting gears of the transmission and/or inhibiting shifting of the gears based on the target speed.

A traditional ACC module that is separate from an ECM is typically not onboard diagnostic (OBD) standard compliant. In order to be OBD standard compliant, a vehicle module needs to satisfy certain criteria. As an example, since the ACC module determines a current vehicle speed based on a signal from a wheel speed sensor or a sensor that is not a transmission output shaft sensor (TOSS), the current vehicle speed is not OBD standard compliant. In order for the determined current vehicle speed to be OBD standard compliant, the current vehicle speed is to be determined based on a signal from a TOSS. Also, since the ACC module is not OBD standard compliant, the target speed cannot be relied upon by the ECM and/or the TCM when performing various tasks, such as output torque adjustments, gear shifting, and/or inhibiting of gear shifting.

The rationality check techniques disclosed herein convert target speeds set by and outputted from a non-OBD standard compliant ACC module to OBD standard compliant values. The OBD standard compliant values are then used by an ECM and a TCM to perform various tasks. The rationality check techniques prevent a non-OBD standard compliant ACC module from needing to be altered in order to be OBD standard compliant while allowing an ECM and a TCM to use target speeds set by the non-OBD standard compliant ACC module when performing the various tasks.

Figure 1:
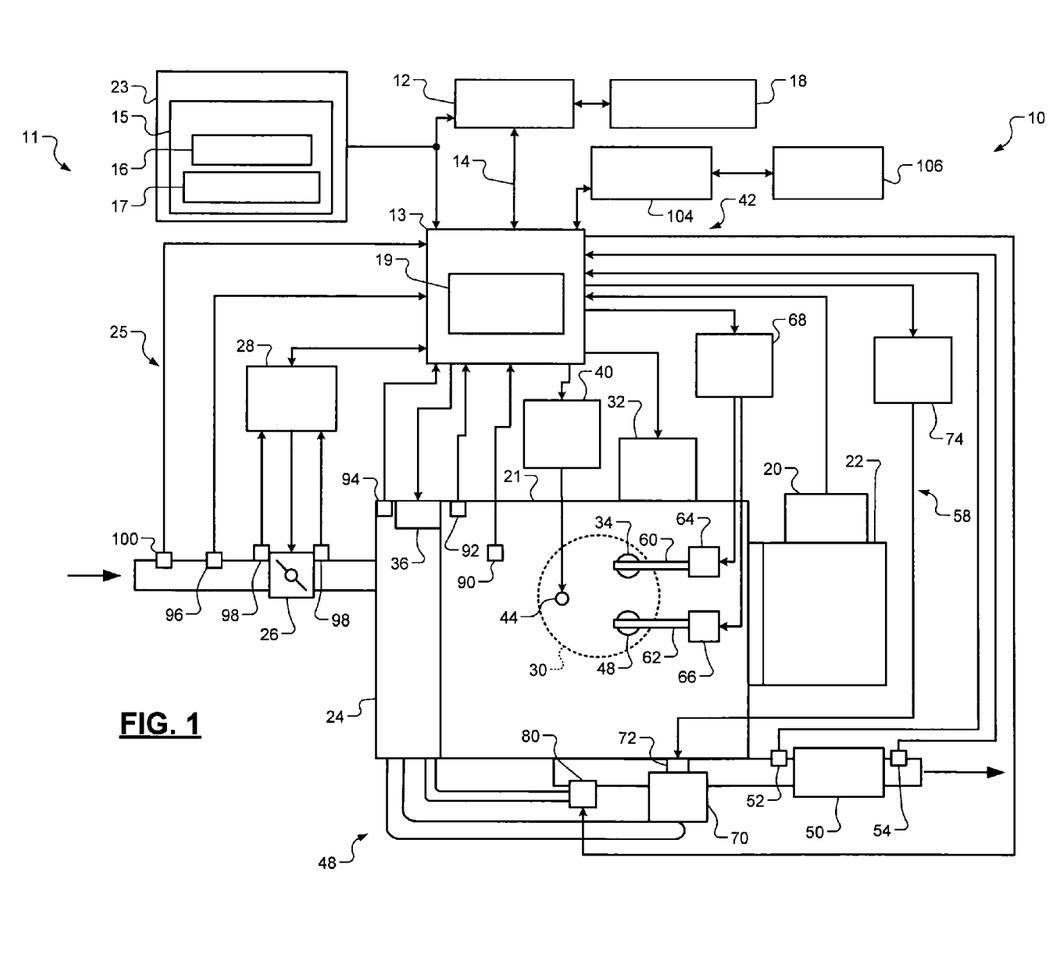
FIG. 1 is a functional block diagram of an engine control system incorporating a ACC rationality check system in accordance with the present disclosure.

In FIG. 1, a drivetrain system 10 of a host vehicle including an ACC rationality check system 11 (or ACC system 11) is shown. Although the following implementations are primarily described with respect to an ACC system, the implementations may be applied to a full speed range adaptive (FSRA) system. The ACC system 11 may be a FSRA system. A FSRA system allows ACC to continue when a speed of a host vehicle decreases to zero and allows ACC to be reactivated when, for example, an accelerator and/or a resume switch is actuated. As an alternative, the ACC system 11 may interrupt ACC when the speed of the vehicle is less than a predetermined speed (e.g., 20 mph).

The ACC system 11 includes an ACC module 12 and an ECM 13. The ACC module 12 is separate from the ECM 13 and may communicate with the ECM 13 via a local area network (LAN) 14 (e.g., a controller area network). The ACC module 12 operates in a standby mode and an active mode. While in the standby mode, the ACC module 12 monitors cruise control switches 15 and transitions to the active mode based on actuation of, for example, a set switch 16. The set switch 16 may be actuated to, for example, reset a first target speed signal $Target_1$ (or first target speed) and activate ACC. The cruise control switches 15 may include the set switch 16 and a resume switch 17, operations of which are described in further detail below.

While in the active mode, the ACC module 12 monitors signal(s) from an object detection system 18. The object detection system 18 may detect object(s) forward of the vehicle. The ACC module 12 may determine distance(s) between the object(s) and the vehicle. Based on the distance (s) and the speed of the vehicle, the ACC module 12 adjusts the first target speed signal $Target_1$. The ACC module 12 may also increment and/or decrement the first target speed signal $Target_1$ based on actuation of the cruise control switches 15. Also while in the active mode, the ACC module 12 generates the first target speed signal $Target_1$ and an axle torque request signal AXEL, which are provided to the ECM 13 via the LAN 14. The ECM 13 may adjust various engine parameters using the below described actuator modules and/or signal the transmission to provide the requested axle torque.

The ECM 13 includes an assessment module 19. The assessment module 19 monitors and evaluates the first target speed signal $Target_1$ from the ACC module 12, determines whether the first target speed signal $Target_1$ passes a rationality check procedure, and converts the first target speed signal $Target_1$ to an OBD standard compliant value (or second target speed signal $Target_2$). The ECM 13 and/or a transmission control module (TCM) 20 may then rely on the second target speed signal $Target_2$. While operating in an ACC mode, the ECM 13 may adjust speed of the engine 21 and/or of the vehicle and/or output torque of the engine 21 to maintain the second target speed signal $Target_2$ (which may be equal to the first target speed $Target_1$) and to maintain a predetermined distance from detected objects. The second target speed signal $Target_2$ may be provided from the ECM 13 to the TCM 20 via the LAN 14.

The drivetrain system 10 further includes an engine 21 and a transmission 22. The engine 21 combusts an air/fuel mixture to produce drive torque for a vehicle based on a driver input module 23. The driver input module 23 may include the cruise control switches 15. Air is drawn into an intake manifold 24 of a throttle control system 25 of the engine 21 through a throttle valve 26. The ECM 13 commands a throttle actuator module 28 to regulate opening of the throttle valve 26 to control the amount of air drawn into the intake manifold 22. Air from the intake manifold 24 is drawn into cylinders of the engine 21. While the engine 21 may include multiple cylinders, for illustration purposes, a single representative cylinder 30 is shown. The ECM 13 via the variable displacement module may instruct a cylinder actuator module 32 to selectively deactivate some of the cylinders to improve fuel economy.

Although the following implementations are described primarily with respect to example internal combustion engines, the implementations of the present disclosure may apply to other internal combustion engines. For example, the present invention may apply to compression ignition, spark ignition, homogenous spark ignition, homogeneous charge compression ignition, stratified spark ignition, and spark assisted compression ignition engines.

Air from the intake manifold 24 is drawn into the cylinder 30 through an intake valve 34. The ECM 13 controls the amount of fuel injected by a fuel injection system 36. The fuel injection system 36 may inject fuel into the intake manifold 24 at a central location or may inject fuel into the intake manifold 24 at multiple locations, such as near the intake valve of each of the cylinders. Alternatively, the fuel injection system 36 may inject fuel directly into the cylinder 30.

The injected fuel mixes with the air and creates the air/fuel mixture in the cylinder 30. A piston (not shown) within the cylinder 30 compresses the air/fuel mixture. Based upon a signal from the ECM 13, a spark actuator module 40 of an ignition system 42 energizes a spark plug 44 in the cylinder 30, which ignites the air/fuel mixture. The spark actuator module 40 may be referred to as an ignition control module. Spark timing may be specified relative to the time when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 48. The byproducts of combustion are exhausted from the vehicle via an exhaust system 48.

The exhaust system 48 includes a catalytic converter 50, a pre-converter (primary) $O_2$ sensor 52, and a post-converter (secondary) $O_2$ sensor 54. The $O_2$ sensors 52, 54 detection oxygen levels upstream and downstream of the catalytic converter 50. The $O_2$ sensors 52, 54 generate respective primary and secondary $O_2$ signals that may be fedback to the ECM 13 for closed loop control of air/fuel ratio(s).

The intake and exhaust valves 34, 48 may be controlled via a valve control system 58, which may include intake and exhaust camshafts 60, 62. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. In an alternative implementation, positioning of the intake and exhaust valves of each cylinder may be individually and independently controlled via dedicated valve actuators (not shown). The cylinder actuator module 32 may deactivate cylinders by halting provision of fuel and/or spark and by disabling respective exhaust and/or intake valves.

The time at which the intake valve 34 is opened may be varied with respect to piston TDC by an intake cam phaser 64. The time at which the exhaust valve 48 is opened may be varied with respect to piston TDC by an exhaust cam phaser 66. A phaser actuator module 68 controls the phasers 64, 66 based on signals from the ECM 13.

The drivetrain system 10 may include a boost device that provides pressurized air to the intake manifold 22. For example, FIG. 1 depicts a turbocharger 70. The turbocharger 70 is powered by exhaust gases flowing through the exhaust system 48, and provides a compressed air charge to the intake manifold 22. A wastegate 72 may allow exhaust gas to bypass the turbocharger 70, thereby reducing the turbocharger's output (or boost). The ECM 13 controls the turbocharger 70 via a boost actuator module 74. The boost actuator module 74 may modulate the boost of the turbocharger 70 by controlling the position of the wastegate 72. Alternate engine systems may include a supercharger that provides compressed air to the intake manifold 22 and is driven by the crankshaft.

The drivetrain system 10 may include an exhaust gas recirculation (EGR) valve 80, which selectively redirects exhaust gas back to the intake manifold 22. In various implementations, the EGR valve 80 may be located after the turbocharger 70. The drivetrain system 10 may measure the speed of the crankshaft in revolutions per minute (RPM) using an RPM sensor 90. The temperature of the engine coolant may be measured using an engine coolant temperature (ECT) sensor 92. The ECT sensor 92 may be located within the engine 21 or at other locations where the coolant is circulated, such as a radiator (not shown).

The pressure within the intake manifold 24 may be measured using a manifold absolute pressure (MAP) sensor 94. In various implementations, engine vacuum may be measured, where engine vacuum is the difference between ambient air pressure and the pressure within the intake manifold 24. The mass of air flowing into the intake manifold 24 may be measured using a mass air flow (MAF) sensor 96. In various implementations, the MAF sensor 96 may be located in a housing with the throttle valve 26.

The throttle actuator module 28 may monitor the position of the throttle valve 26 using one or more throttle position sensors (TPS) 98. The ambient temperature of air being drawn into the engine control system may be measured using an intake air temperature (IAT) sensor 100. The ECM 13 may use signals from the sensors to make control decisions for the engine control system.

The ECM 13 may communicate with a hybrid control module 104 to coordinate operation of the engine 21 and an electric motor 106. The electric motor 106 may also function as a generator, and may be used to produce electrical energy for use by vehicle electrical systems and/or for storage in a battery. In various implementations, the ECM 13 and the hybrid control module 104 may be integrated into one or more modules.

To abstractly refer to the various control mechanisms of the engine 21, each system that varies an engine parameter may be referred to as an actuator. For example, the throttle actuator module 28 can change the blade position, and therefore the opening area, of the throttle valve 26. The throttle actuator module 28 can therefore be referred to as an actuator, and the throttle opening area can be referred to as an actuator position.

Similarly, the spark actuator module 40 can be referred to as an actuator, while the corresponding actuator position is amount of spark advance. Other actuators include the boost actuator module 74, the EGR valve 80, the phaser actuator module 68, the fuel injection system 36, and the cylinder actuator module 32. The term actuator position with respect to these actuators may correspond to boost pressure, EGR valve opening, intake and exhaust cam phaser angles, air/fuel ratio, and number of cylinders activated, respectively.

The transmission 22 may be controlled by the TCM 20 and may be shifted based on the second target speed $Target_2$, as further described below. The transmission 22 may be an automatic transmission. The TCM 20 may upshift or downshift between gears depending upon whether the TCM 20 is increasing or decreasing the speed of the vehicle.

Figure 2:
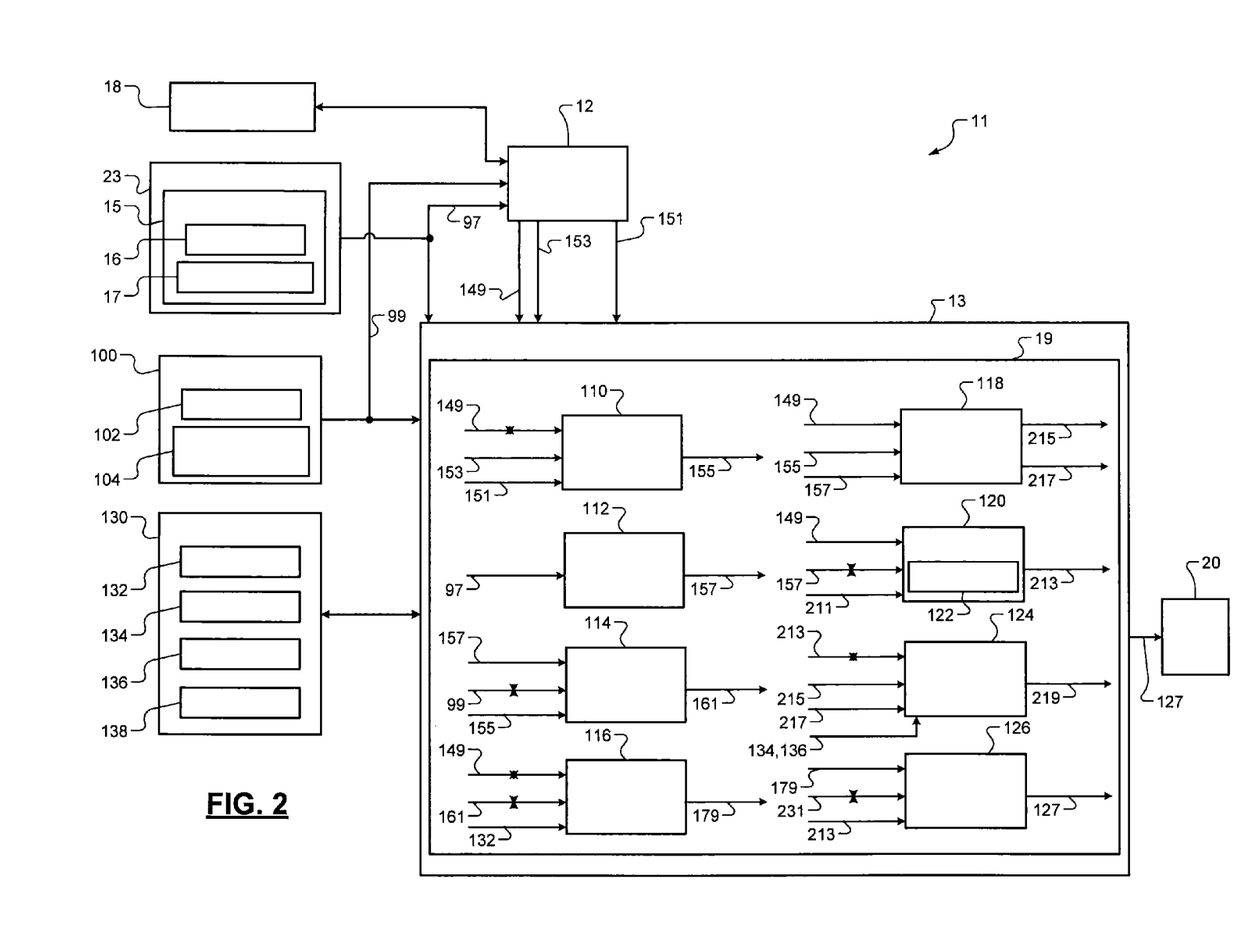
FIG. 2 is a functional block diagram of the ACC rationality check system in accordance with the present disclosure.

In FIG. 2, the ACC system 11 is shown and includes the ACC module 12, the ECM 13 and the TCM 20. The ACC module 12 receives: object signal(s) from the object detection system 18; switch signals CC (97) from the cruise control switches 15 (and/or the driver input module 23); and speed sensor signals SPEED (99) from the speed sensors 100. The speed sensors 100 may include a transmission output shaft sensor (TOSS) 102, wheel speed sensors 104, and/or other suitable speed sensors. The ACC module 12 generates the first target speed signal $Target_1$ and the axle torque request signal AXEL based on the object signals, the switch signals CC, and the speed sensor signals SPEED. Although the signals from the object detection system 18, the driver input module 23 and the speed sensors 100 are shown as being directly provided to the ACC module 12, the signals may be provided to the ECM 13 and then provided from the ECM 13 to the ACC module 12.

The ECM 13 includes the assessment module 19. The assessment module 19 includes an active module 110, a CC switch module 112, a vehicle speed module 114, a first comparison module 116, an ACC target speed module 118, a delay module 120 with a delay timer 122, a second comparison module 124, and an ECM target speed module 126. The assessment module 19 monitors the switch signals CC, the speed sensor signals SPEED, the first target speed signal $Target_1$, and the axle torque request signal AXEL. The assessment module 19 generates the second target speed signal $Target_2$ (127) based on these signals using the modules 110-120, 124, 126, as further described with respect to the method of FIG. 3.

The second target speed signal $Target_2$ may have two states including an OBD standard compliant state and a null (e.g., 0 or predetermined value) state. The assessment module 19 may set the second target speed signal $Target_2$ in the OBD standard compliant state when a rationality check procedure has passed. The assessment module 19 may set the second target speed signal $Target_2$ in the null state when a rationality check procedure has failed. When in the OBD standard compliant state, the second target speed signal $Target_2$ may be set equal to the first target speed signal $Target_1$.

The ACC system 11 may also include a memory 130. The memory 130 may be included in the ECM 13 or may be separate from and accessed by the ECM 13, as shown. The memory 130 may store various values and periods used by the assessment module 19. For example, the memory 130 may store tolerance values 132, increment values 134, decrement values 136, and predetermined periods 138. Examples and use of these values and periods are described with respect to the method of FIG. 3.

The TCM 20 receives the second target speed signal Target$_2$ and may control operation of the transmission 22 (shown in FIG. 1) based on the second target speed signal Target$_2$. The TCM 20 may shift gears and/or inhibit shifting of gears based on the second target speed signal Target$_2$. The TCM 20 may not rely on the second target speed signal Target$_2$ when a rationality check procedure fails. Examples of this are described with respect to the method of FIG. 3. The TCM 20 may determine whether to shift gears based on core calibrations of the TCM 20 when a rationality check procedure fails.

Figure 3:
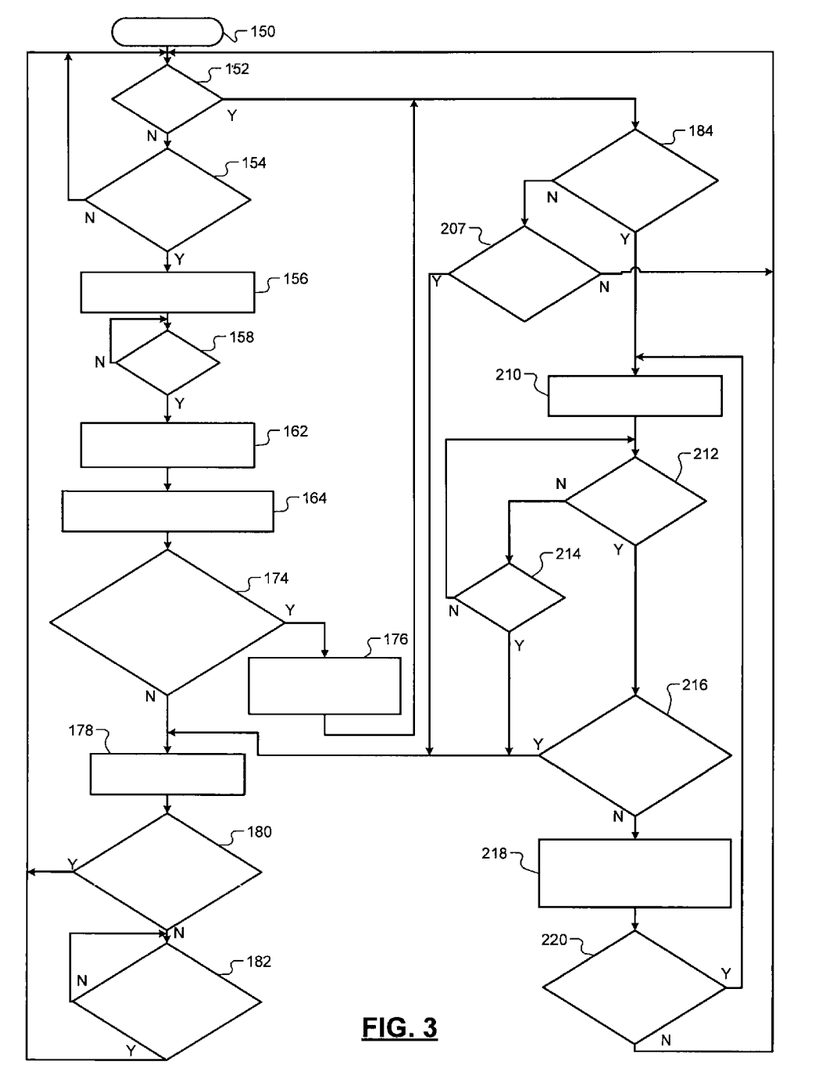
FIG. 3 illustrates a method of operating an ACC rationality check system in accordance with the present disclosure.

The ACC system 11 may be operated using numerous methods, an example method is provided by the method of FIG. 3. In FIG. 3, a method of operating the ACC system 11 is shown. Although the following tasks are primarily described with respect to the implementations of FIGS. 1-2, the tasks may be easily modified to apply to other implementations of the present disclosure. The tasks may be iteratively performed. The method may begin at 150.

The following tasks 152-178 are performed during an initial activation of ACC. At 152, the active module 110 determines whether the ACC module 12 is in the active mode. The active module 110 may determine that the ACC module 12 is in the active mode based on the first target speed signal Target$_1$ (149), the axle torque request signal AXEL (151), and/or a first mode signal ACTIVE (153) from the ACC module 12. The active module 110 generates a second mode signal ACC (155) indicating that the active module 110 is in the active mode. If the ACC module 12 is not in the active mode, task 154 is performed, otherwise task 184 is performed.

At 154, the CC switch module 112 may determine whether the set switch 16 has been actuated and/or released based on the switch signals CC (97). The actuating and releasing of the set switch 16 may indicate that a vehicle operator is activating ACC and is requesting that drivetrain system 10 maintain a current vehicle speed. The CC switch module 112 may generate a switch signal ACT (157) indicating that the set switch 16 has been actuated and released. If the set switch 16 is actuated and released, task 156 is performed, otherwise the assessment module 19 may return to task 152.

At 156, the vehicle speed module 114 captures a first (current) vehicle speed Vspd (161). The vehicle speed may be captured when the set switch 16 is released. At 158, the active module 110 determines whether the ACC module 12 is in the active mode. During this period, the ACC module 12 may be transitioned from an inactive mode (powered down mode) or the standby mode to the active mode to perform ACC. The ACC module 12 may transmit the first mode signal ACTIVE to the assessment module 19 via the LAN 14 indicating that the ACC module 12 is in the active mode. If the ACC 12 is in the active mode, task 162 is performed.

At 162, the vehicle speed module 114 may wait a calibratable duration of time. The vehicle speed module 114 may wait the predetermined period to allow the ACC module 12 to detect the actuation and release of the set switch 16 and to transition to the active mode. The vehicle speed module 114 may wait the predetermined period via a delay timer 122 to allow time for the ACC module 12 to send over the first target speed Target$_1$. The vehicle speed module 114 may determine the first vehicle speed Vspd based on the second mode signal ACC, the switch signal ACT, and the speed signals SPEED. The first vehicle speed Vspd may be determined based on a signal from the TOSS 102 to be OBD standard compliant. Task 162 may be performed while tasks 156-158 are performed.

At 164, the ACC module 12 determines a second (current) vehicle speed based on one or more of the speed signals SPEED and sets the first target speed signal Target$_1$ equal to the second vehicle speed. The second vehicle speed may be determined while the vehicle speed module 114 determines the first vehicle speed Vspd and may be different than the first vehicle speed Vspd due to, for example, the use of signals from different sensor(s). The ACC module 12 may determine the second vehicle speed based on signals from one or more of the speed sensor(s) 100 or based on other suitable sensors. The ACC module 12 indicates the first target speed by transmitting the first target speed signal Target$_1$ to the assessment module 19. An example of setting the first target speed is shown in FIG. 4.

Figure 4:
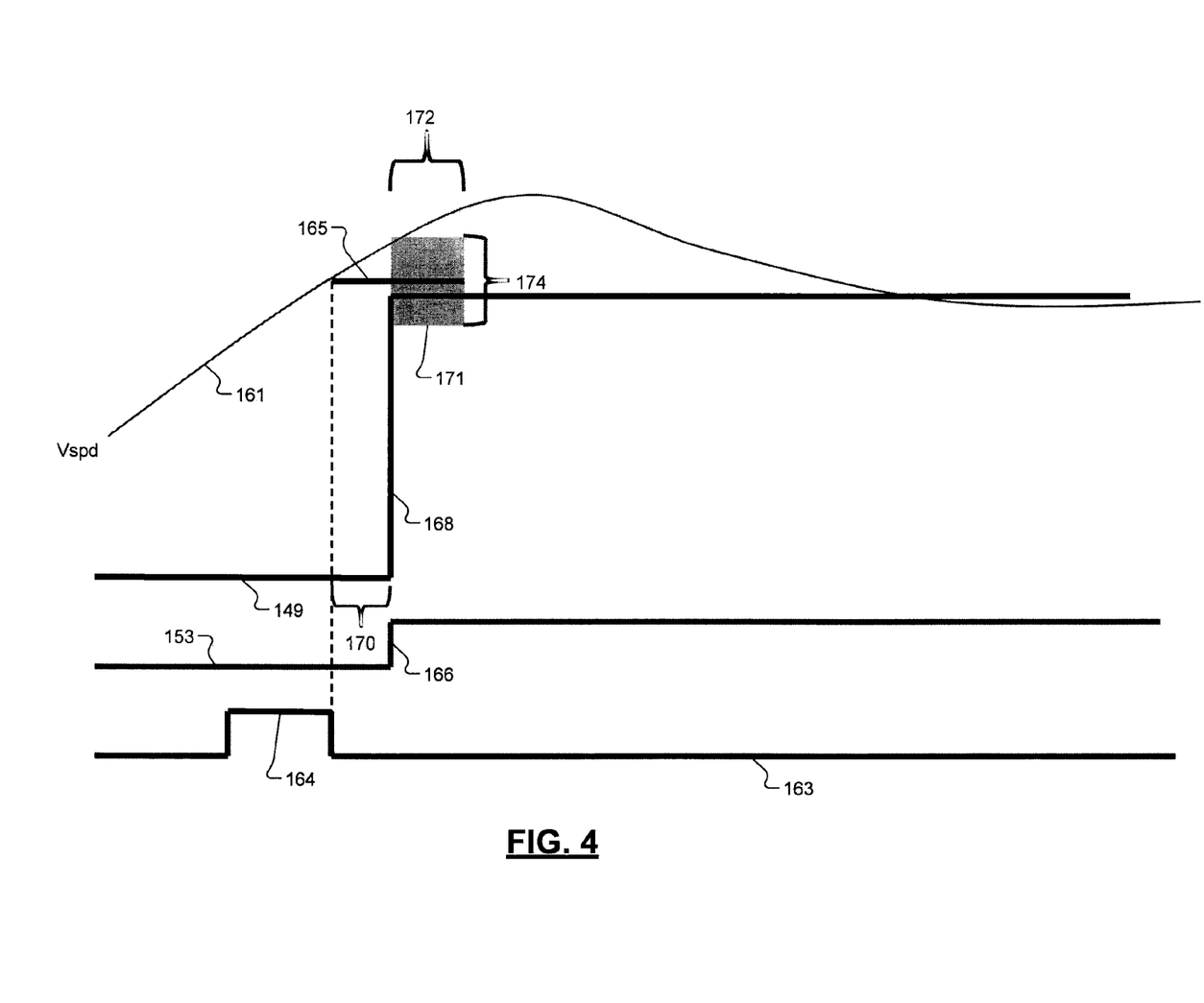
FIG. 4 is a plot of ACC signals during an initial engagement illustrating delay and vehicle speed tolerances in accordance with the present disclosure.

In FIG. 4, a plot of ACC signals during an initial ACC engagement is shown. The ACC signals include examples of the first vehicle speed Vspd, the first target speed signal Target$_1$, the second mode signal ACC, and a signal SET (163) from the set switch 16. A pulse 164 is shown illustrating when the set switch 16 is actuated and released. The first vehicle speed Vspd may be captured after a calibratable period after the set switch 16 is released or when the set switch 16 is released, as shown by curve 165. Subsequent to the set switch 16 being released, the ACC module 12 transitions to the active mode, as indicated by the change in the second mode signal ACC at 166. Also subsequent to the set switch 16 being released, the ACC module 12 sets the first target speed, as indicated by the change in the first target speed signal Target$_1$ at 168. A delay between when the set switch 16 is released and when the ACC module 12 transitions to the active mode and sets the first target speed is designated 170.

A shaded area 171 is shown for a first range 172 and a second range 174. The first range 172 refers to a predetermined period from when ACC goes active 166. The second range 174 refers to a tolerance range about the first vehicle speed Vspd in which the first target speed is considered to have passed a first rationality check procedure. If the first target speed is set within the first range 172 and the value of the first target speed is within the tolerance range, the first target speed is considered OBD standard compliant. As an example, the first range may be 400 milli-seconds (ms). The first range may begin when the set switch 16 is released or at a time subsequent to when the set switch 16 is released, as shown. As another example, the tolerance range may include speeds ±3 miles per hour (mph) from the first vehicle speed Vspd.

At 174, the first comparison module 116 may determine: whether the first target speed is set by the ACC module 12 within the predetermined period after the set switch 16 was released; and/or whether the first target speed is equal to the first vehicle speed Vspd plus or minus a tolerance factor TOL (i.e. within the tolerance range). These determinations may be performed based on the first vehicle speed Vspd and the first target speed signal Target$_1$. If the first target speed signal Target$_1$ is set within the predetermined period and is equal to the first vehicle speed Vspd captured by the vehicle speed module 114 plus or minus the tolerance factor TOL, then task 176 is performed, otherwise task 178 is performed. Task 174 assures that the first target speed when relied upon by the ECM 13 and/or the TCM 20 is OBD standard compliant. By relying on the first target speed and not the vehicle speed Vspd or a current vehicle speed, tasks are performed based on the speed that ACC is targeting, which may be different than a current vehicle speed.

At 176, the ECM target speed module 126 sets the second target speed signal $Target_2$ equal to the first target speed signal $Target_1$. This indicates that the first rationality check procedure has passed. The first rationality check procedure may include tasks 156, 158, 160, 162, 174. The ECM target speed module 126 may transmit the second target speed signal $Target_2$ to the TCM 20. The TCM 20 may then perform various operations based on the second target speed signal $Target_2$. For example, the TCM 20 may operate in a cruise downshift inhibit mode and inhibit downshifting of the transmission 22 based on the second target speed signal $Target_2$. This may be performed when the speed of the vehicle is within a predetermined range of the first target speed and a vehicle deceleration level is less than a predetermined level. The cruise downshift inhibit mode prevents multiple gear shifts in a short or predetermined period.

As another example, the TCM 20 may operate in a cruise downgrade braking mode. This may include downshifting when the vehicle is on declined road and the speed of the vehicle is increasing and/or greater than the first target speed. The downshift of the transmission 22 provides engine braking, which minimizes wheel braking to maintain the first target speed. Upon completing task 176, the ECM 13 may return to task 152.

At 178, the ECM target speed module 126 may set the second target speed signal $Target_2$ equal to 0 or another predetermined value. This indicates that the first rationality check procedure has failed. This may occur when the first target speed signal $Target_1$ is not set in the predetermined period and/or is not equal to the captured vehicle speed plus or minus the tolerance factor TOL. The first comparison module 116 may generate a first assessment signal A1 (179) indicating whether the first rationality check procedure has passed. The ECM target speed module 126 may set the second target speed signal $Target_2$ equal to the first target speed signal $Target_1$ based on the first assessment signal A1.

At 180, the CC switch module 112 determines whether the set switch 16 has been actuated to reset the first target speed. If the set switch 16 is not actuated to reset the first target speed, task 182 may be performed, otherwise task 152 may be performed.

At 182, the active module 110 determines whether the ACC module 12 has transitioned from the active mode to the standby mode or the inactive mode. If the ACC module 12 has transitioned from the active mode, task 152 is performed.

The following tasks 184, 210, 212, 214, 216, 218, 220 may be performed for an incremental or decremental change in the first target speed. The change may be a small change (e.g., 1 mph) or a large change (e.g., 5 mph). Tasks 184, 207, 210, 212, 214, 216 may be referred to as a second rationality check procedure.

At 184, the CC switch module 112 determines whether the set switch 16 or the resume switch 17 has been actuated to perform an incremental increase or decrease in the first target speed. This may be indicated by the switch signal ACT. If the set switch 16 or the resume switch 17 has been actuated to perform an incremental change in the first target speed, the ACC module 12 adjusts the first target speed accordingly by changing the first target speed signal $Target_1$. The set switch 16 may be tapped to decrement the first target speed, as described above. The resume switch 17 may be tapped (depressed for less than or equal to a third predetermined period) to increment the first target speed or held in a depressed state to incrementally ramp up the first target speed. An increment in the first target speed is shown in FIG. 5.

Figure 5:
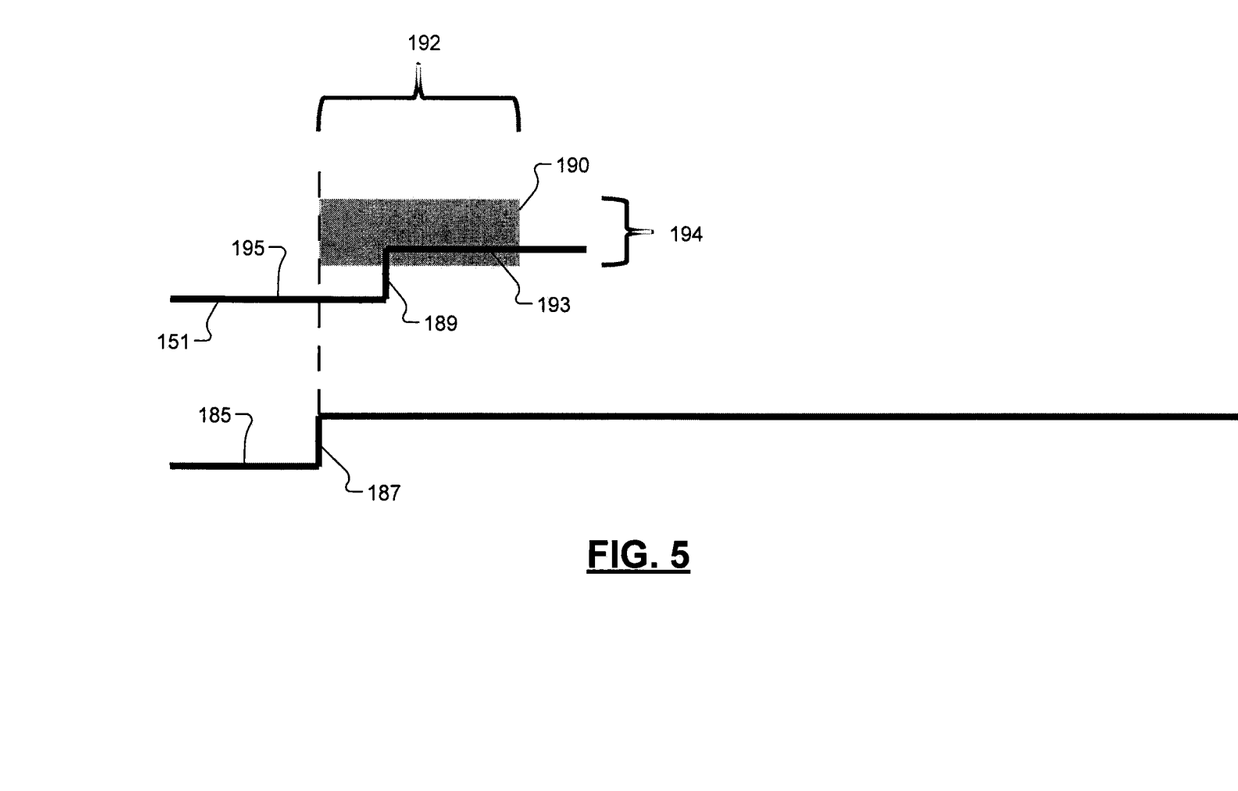
FIG. 5 is a plot of ACC signals illustrating delay and vehicle speed tolerances for a tap increment in accordance with the present disclosure.

In FIG. 5, a plot of ACC signals is shown illustrating delay and vehicle speed tolerances for a tap increment. The ACC signals include examples of the first target speed signal $Target_1$ and a resume switch signal RESUME (185). The resume switch 17 may be tapped or held, as shown. Actuation of the resume switch 17 to a held position occurs at 187. The first target speed is updated subsequent to when the resume switch 17 is actuated, as indicated at 189 on the first target speed signal $Target_1$. The amount that the first target speed is changed may be a predetermined incremental value (e.g., 1 mph). The first target speed may be updated when the resume switch 17 is actuated or may be updated a delay period (e.g., 0.25 seconds (s)) after the resume switch 17 is actuated, as shown.

A shaded area 190 is shown for a first range 192 and a second range 194. The first range 192 refers to a predetermined period from when the resume switch 17 is actuated. The second range 194 refers to a tolerance range in which the updated first target speed (e.g., 193) is expected based on the previous first target speed (e.g., 195). If the updated first target speed is set within the first range 192 and the value of the first target speed is within the second range 194, the updated first target speed is considered to be OBD standard compliant and pass the second rationality check procedure.

If the resume switch 17 is held in a depressed state for longer than the third predetermined period, the ACC module 12 may incrementally increase the first target speed. While the resume switch 17 is held in the depressed state and for each period of time equal to, for example, the third predetermined period that lapses, the ACC module 12 increments the first target speed. An example of this is shown in FIG. 6.

Figure 6:
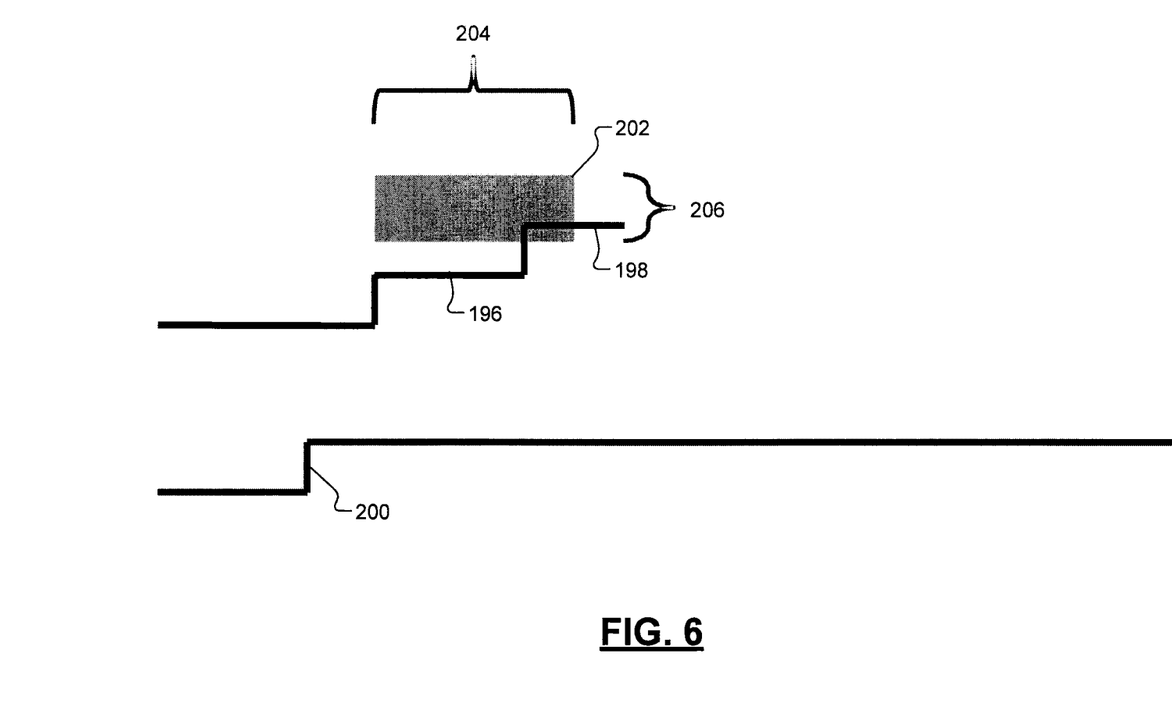
FIG. 6 is a plot of ACC signals illustrating delay and vehicle speed tolerances for incremental ramping in accordance with the present disclosure.

In FIG. 6, a plot of ACC signals is shown illustrating delay and vehicle speed tolerances for incremental ramping. Although the following rationality check is described with respect to incremental ramping (or incrementally increasing a target speed), a rationality check may be similarly performed for decremental ramping (or decrementally decreasing a target speed). The ACC signals include examples of the first target speed signal $Target_1$ and the resume switch signal RESUME. The first target speed may be incrementally increased when the resume switch 17 is held in an ON or depressed state. The first target speed may be incrementally increased for each third predetermined period of time that passes and the resume switch 17 remains in the depressed state. This is shown by two incremental increases (speeds of which are designated 196, 198) in the first target speed signal $Target_1$. The resume switch 17 is actuated to the depressed state at 200. Each incremental increase may be the same or different.

A shaded area 202 is shown for a first range 204 and a second range 206. The first range 204 refers to a predetermined period from when the first target speed is changed. The second range 206 refers to a tolerance range in which the updated first target speed (e.g., 198) is expected based on the previous first target speed (e.g., 196). If the updated first target speed is set within the first range 204 and the value of the first target speed is within the second range 206, the updated first target speed is considered to be OBD standard compliant and pass the second rationality check procedure.

If the set switch 16 or the resume switch 17 has not been actuated to perform an incremental increase or decremental decrease in the first target speed, task 207 is performed, otherwise task 210 is performed. At 207, the ACC target speed module 118 determines whether the first target speed has been changed by the ACC module 12. If the first target speed has been changed, task 178 may be performed, as the second rationality check procedure has failed.

At 210, the delay module 120 may start the delay timer 122 to allow the second comparison module 124 to determine whether the first target speed has been changed within an expected or predetermined period PP 211. For example, the delay module 120 may detect when one of the cruise control switches 15 has been actuated to change the first target speed based on the switch signal ACT and start the delay timer. The delay module 120 may determine an amount of time DELAY (213) from when the one of the cruise control switches 15 was actuated to when the ACC module 12 changes the first target speed.

At 212, the ACC target speed module 118 determines whether the first target speed signal $Target_1$ has changed provided by a change signal CHG (215) (TRUE or FALSE signal) and the amount of that change indicated by a difference signal $\Delta T$ (217). The magnitude of the change and corresponding predetermined range can each vary or be different for various reasons. For example, the magnitude of the change and corresponding predetermined range may be different when the drivetrain system 10 is used in different geographical regions (e.g., U.S. or Europe) or when different units of measure (e.g., kilometers (km)/h or mph) are being used on a driver display. As another example, the magnitude of the change and corresponding predetermined range may be different when speed biasing is performed.

Speed biasing may be performed when, for example, a detected current vehicle speed is multiplied by a multiplier to obtain an adjusted vehicle speed, which is indicated to a vehicle operator. The adjusted vehicle speed may not be the actual vehicle speed, but rather may be a speed greater than the actual vehicle speed. This satisfies a speedometer standard assuring that an actual vehicle speed is not greater than an indicated vehicle speed.

The ACC module 12 and/or the ECM 13 may compensate for this multiplier when determining a current vehicle speed and when selecting predetermined incremental values, decremental values, and/or ranges. For example, the ECM 13 may multiply the current vehicle speed Vspd by a second multiplier to compensate for the multiplier used for speed biasing. The ECM 13 may also adjust predetermined incremental values, decremental values and/or ranges based on the multiplier used for speed biasing. This minimizes errors between the first target speed as determined by the ACC module 12 and expected target speed values determined by the ECM 13. This also minimizes accumulating errors when the first target speed is incremented and/or decremented multiple times during a ACC session.

If the first target speed has not changed task 214 is performed, otherwise task 216 is performed. At 214, the second comparison module 124 determines whether the predetermined period PP is up based on the amount of time DELAY. If the predetermined period PP has expired, task 178 may be performed, otherwise task 212 may be performed. Tasks 210-214 are performed to check that the ACC module 12 detected the actuation in the set switch 16 or the resume switch 17 and changed the first target speed within the predetermined period PP. If the ACC module 12 did not change the first target speed in the predetermined period PP the second rationality check procedure failed.

Figure 7:
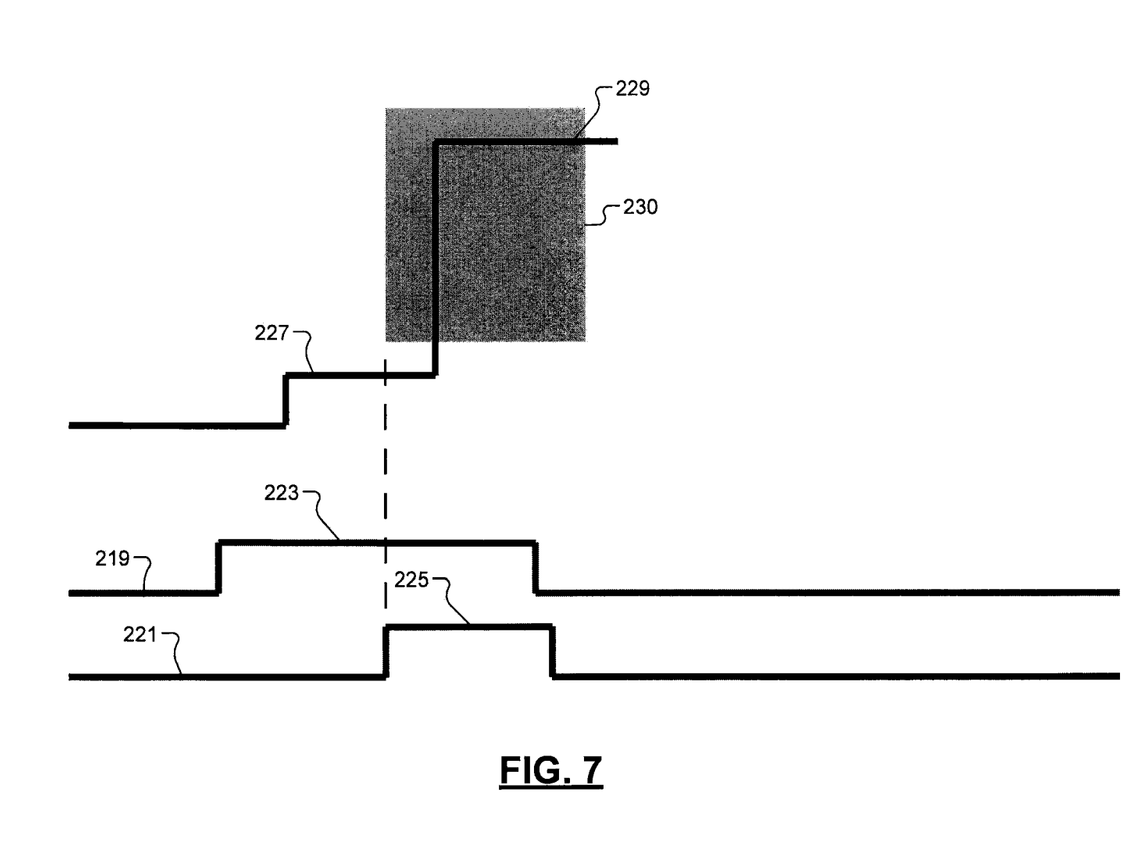
FIG. 7 is a plot of ACC signals illustrating delay and vehicle speed tolerances for different sized tap increments.

At 216, the second comparison module 124 determines whether the change in the first target speed is within an expected or predetermined range based on the change signal CHG, difference signal $\Delta T$, and predetermined increment or decrement values (e.g., values 134, 136). The second comparison module 124 may also check to see if the change is in a correct direction; the direction meaning either incremented or decremented. These values may be small incremental or decremental values (e.g., 1 mph) and/or large incremental or decremental values (e.g., 5 mph). Examples of small and large incremental changes are shown in FIG. 7. If the change in the first target speed is not within an expected or predetermined range, task 178 is performed, otherwise task 218 is performed.

In FIG. 7, a plot of ACC signals is shown illustrating delay and vehicle speed tolerances for different sized tap increments. The ACC signals include examples of the first target speed signal $Target_1$ and resume signals $RESUME_1$ (219), $RESUME_2$ (221). The cruise control switches 15 may include multiple resume switches or a resume switch assembly with an actuator and multiple detent positions. The detent positions may have corresponding step thresholds for rationality check pass determinations. The actuator may be actuated into each of the detent positions. Each of the detent positions may include a respective electronic switch. The first resume signal $RESUME_1$ indicates when the actuator is in the first detent position and the first switch is closed, as indicated by pulse 223. The second resume signal $RESUME_2$ indicates when the actuator is in the second detent position and the second switch is closed, as indicated by pulse 225. The first target speed may be incremented by a small amount when the first switch is closed, as indicated at 227. The first target speed may be incremented by a large amount when the second switch is closed, as indicated at 229. Tasks 184, 210-216 may be performed to determine whether the large increment is performed within the predetermined time PP and/or whether the large change in the first target speed is within a predetermined range. This is indicated by shaded area 230.

If the first target speed changed within the predetermined period PP and the change in the first target speed is within a predetermined range, less than a predetermined value, and/or in a correct direction, then the second rationality check procedure passed. This is determined by tasks 212-216. The second comparison module 124 may compare: the difference signal $\Delta T$ with an expected or predetermined difference; the updated first target speed with a sum of the previous first target speed and the expected or predetermined difference; and/or a sum of an original first target speed set when ACC was initiated and a product of a number of updated target speed iterations and a predetermined value per target speed iteration. This comparison may also be adjusted for varying sized incremental or decremental changes (e.g., 1 mph to 5 mph) and speed biasing. The second comparison module 124 may generate a second assessment signal A2 (231) indicating whether the second rationality check procedure has passed. The ECM target speed module 126 may set the second target speed signal $Target_2$ equal to the first target speed signal $Target_1$ based on the second assessment signal A2.

Task 218 is performed when the second rationality check procedure passes, otherwise task 178 is performed. At 218, the ECM target speed module 126 sets the second target speed equal to the first target speed plus or minus a predetermined amount based on the second assessment signal A2 and the delay signal DELAY.

At 220, the CC switch module 112 determines whether the set switch 16 or the resume switch 17 is held in an ON or depressed state. The vehicle operator may hold the set switch 16 to ramp down the set speed. The vehicle operator may hold the resume switch 17 to ramp up the set speed. If the set switch 16 or the resume switch 17 is held in an ON or depressed state, task 210 is performed, otherwise task 152 is performed.

In the above-described tasks, an OBD compliant module is configured to use information from a non-OBD compliant module. For example, at tasks 176 and 218 information (the first target speed $Target_1$) from a non-OBD compliant module (the ACC module 12) is used by an OBD compliant module (ACC assessment module 19). This information is considered OBD compliant when used by the OBD compliant module, as the OBD compliant module performs the above-described OBD compliant rationality check algorithm(s). This eliminates the need to modify and/or convert a non-OBD compliant module into an OBD compliant module.

If at any time during the above-described method the first target speed signal $Target_1$ changes unexpectedly (i.e. during a period of time when the first target speed signal $Target_1$ should not have changed), the associated rationality check procedure fails. This causes the second target speed signal $Target_2$ to be set to zero or a predetermined value indicating that a rationality check procedure has failed.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above-described implementations provide an ACC target speed signal (e.g., $Target_2$) that is OBD standard compliant based on a target speed signal (e.g., $Target_1$) that may not be considered OBD standard compliant. Also, as the implementations perform sequential checks of the first target speed from an ACC module and rely on the first target speed from the ACC module instead of relying on an ECM determined vehicle speed as a target speed, the implementations periodically null errors. For this reason the implementations prevent accumulative errors between the first target speed and ECM expected vehicle speeds. This allows automatic transmission gear determination to be performed to improve ACC performance.

The implementations also accommodate different delays between when cruise control switches are actuated and when an ACC module sets and/or updates the first target speed. The different delays are accommodated by using the predetermined periods of time and/or ranges when determining whether the first target speed passes a rationality check procedure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
a vehicle speed module that determines a speed of a vehicle;
an engine control module that receives a first target speed signal and a torque request signal from an adaptive cruise control (ACC) module, wherein the ACC module is separate from the engine control module;
a first comparison module that compares the first target speed signal to the speed of the vehicle to generate a first assessment signal; and
a first target speed module that sets a second target speed signal equal to one of the first target speed signal and a predetermined value based on the first assessment signal,
wherein the engine control module controls an engine to provide an engine output torque based on at least one of the torque request signal and the second target speed signal, and
wherein the predetermined value indicates that a rationality check procedure of the first target speed signal has failed.

2. The system of claim 1, wherein:
the ACC module and the first target speed signal are not onboard diagnostic standard compliant; and
the second target speed signal is generated based on a rationality check of the first target speed signal and is onboard diagnostic standard compliant.

3. The system of claim 1, wherein:
the vehicle speed module determines the vehicle speed based on a signal from a transmission output shaft sensor; and
the first target speed signal is not generated based on the signal from the transmission output shaft sensor.

4. The system of claim 1, further comprising an active module that detects whether the ACC module is in an active mode,
wherein the engine control module receives the first target speed signal based on whether the ACC module is in the active mode.

5. The system of claim 1, further comprising:
a switch module that determines whether a cruise control switch is actuated to perform an incremental or decremental change in the first target speed signal based on whether the ACC module is in an active mode;
a delay module that generates a delay signal indicating whether the ACC module changed the first target speed signal to generate an updated target speed signal within a predetermined period based on whether the cruise control switch is actuated;

a second comparison module that compares a magnitude in the change of the first target speed signal to a predetermined range to generate a second assessment signal; and a second target speed module that sets the second target speed signal equal to the updated target speed signal based on the second assessment signal.

6. The system of claim 1, further comprising a switch module that determines whether a cruise control switch has been actuated and released, wherein the vehicle speed module determines the speed of the vehicle based on whether the cruise control switch has been actuated and released.

7. The system of claim 6, wherein the vehicle speed module waits a predetermined period after the switch module detects that the cruise control switch has been actuated and released to determine the speed of the vehicle.

8. The system of claim 1, wherein the first comparison module:

determines whether the ACC module set the first target speed signal within a predetermined period; and sets the second target speed signal equal to the first target speed signal based on whether the ACC module sets the first target speed signal within the predetermined period.

9. The system of claim 1, wherein:

the first comparison module when comparing the first target speed signal to the speed of the vehicle compares the first target speed signal to the speed of the vehicle plus or minus a tolerance value to generate the first assessment signal;

the engine control module determines whether the first target speed signal passes a rationality check procedure based on the first assessment signal; and the first target speed module sets the second target speed signal equal to the first target speed signal when the first target speed signal passes the rationality check procedure.

10. The system of claim 1, wherein the engine control module transmits the second target speed signal to a transmission control module.

11. The system of claim 10, further comprising the transmission control module that at least one of changes a transmission gear and operates in a cruise downshift inhibit mode based on the second target speed signal.

12. A system comprising:

an active module that detects whether an adaptive cruise control (ACC) module is in an active mode;

a delay module that generates a delay signal indicating whether the ACC module sets a first target speed signal within a predetermined period based on whether the ACC module is in the active mode;

a first target speed module that receives the first target speed signal from the ACC module, detects a change in the first target speed signal, and determines a magnitude of the change in the first target speed signal;

a comparison module that compares the magnitude to a predetermined range and generates an assessment signal based and the comparison; and a second target speed module that sets, based on the delay signal and the assessment signal, a second target speed signal (i) based on the first target speed signal, or (ii) equal to a predetermined value, wherein the predetermined value indicates that a rationality check procedure of the first target speed signal has failed.

13. The system of claim 12, wherein the second target speed module sets the second target speed signal equal to the first target speed signal plus or minus a predetermined amount based on the assessment signal.

14. The system of claim 12, wherein:

the ACC module and the first target speed signal are not onboard diagnostic standard compliant; and the second target speed signal is generated based on a rationality check of the first target speed signal and is onboard diagnostic standard compliant.

15. The system of claim 12, wherein the second target speed module sets the second target speed signal equal to one of the first target speed signal and the predetermined value based on the assessment signal.

16. The system of claim 12, wherein second target speed module transmits the second target speed signal to a transmission control module.

17. The system of claim 16, further comprising the transmission control module that at least one of changes a transmission gear and operates in a cruise downshift inhibit mode based on the second target speed signal.

18. The system of claim 12, further comprising a switch module that determines whether a cruise control switch is actuated to perform an incremental or decremental change in the first target speed signal based on whether the ACC module is in the active mode, wherein the delay module generates the delay signal when the cruise control switch is actuated to perform an incremental or decremental change in the first target speed signal.

19. The system of claim 12, further comprising a switch module that determines whether a cruise control switch is held in one of an ON state and a depressed state, wherein the delay module generates the delay signal when the cruise control switch is held in one of an ON state and a depressed state.

* * * * *